United States Patent
Tanikawa

(10) Patent No.: US 6,918,853 B2
(45) Date of Patent: Jul. 19, 2005

(54) PLANETARY GEAR MECHANISM

(75) Inventor: Naoya Tanikawa, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/374,065

(22) Filed: Feb. 27, 2003

(65) Prior Publication Data

US 2003/0181285 A1 Sep. 25, 2003

(30) Foreign Application Priority Data

Feb. 27, 2002 (JP) ........................................ 2002-051230

(51) Int. Cl.[7] .............................................. F16H 57/08
(52) U.S. Cl. ...................................... 475/348; 475/331
(58) Field of Search ............................ 475/331, 336–8, 475/346, 348; 74/439

(56) References Cited

U.S. PATENT DOCUMENTS

| | | | | |
|---|---|---|---|---|
| 3,667,324 A | * | 6/1972 | Laing | 475/348 |
| 4,222,290 A | * | 9/1980 | Helmer et al. | 475/331 |
| 4,901,601 A | * | 2/1990 | Leggat | 475/348 |
| 4,998,909 A | * | 3/1991 | Fuehrer | 475/348 |
| 5,370,590 A | * | 12/1994 | Premiski et al. | 475/346 |
| 5,480,362 A | | 1/1996 | Tanaka et al. | |
| 5,928,105 A | * | 7/1999 | Taha et al. | 475/346 |
| 6,023,836 A | * | 2/2000 | Matsuoka et al. | 475/331 |

FOREIGN PATENT DOCUMENTS

| | | |
|---|---|---|
| JP | 5-248499 A | 9/1993 |
| JP | 6-59381 A | 3/1994 |
| JP | 9-303495 A | 11/1997 |

* cited by examiner

*Primary Examiner*—Roger Pang
(74) *Attorney, Agent, or Firm*—Burns, Doane, Swecker & Mathis, L.L.P.

(57) ABSTRACT

A planetary gear includes a sun gear, a ring gear, a plurality of pinion gears geared with the sun gear and the ring gear, a plurality of pinion pins provided at internal peripheral side and coaxial to the pinion gear to be rotatable relative to the pinion gear, a carrier having penetration bores inserted with axial end portions of the pinion pin for supporting the pinion pins so that the pinion gears rotate about the sun gear, a plate member provided on the carrier, a slit formed on an axial end portion of the pinion pin projected from one of the penetration bores, a fitting portion unitary formed on the plate member to be fitted into the slit, a recess portion of the carrier recessed in an axial direction, and a projecting portion unitary formed on the plate member to be engaged with the recess portion of the carrier.

19 Claims, 6 Drawing Sheets

PLANETARY GEAR MECHANISM

This application is based on and claims priority under 35 U.S.C. § 119 with respect to Japanese Patent Application No. 2002-051230 filed on Feb. 27, 2002, the entire content of which is incorporated herein by reference.

FIELD OF THE INVENTION

The present invention relates to a planetary gear mechanism. More particularly, the present invention pertains to a fixing construction between a pinion pin and a carrier of a planetary gear mechanism.

BACKGROUND OF THE INVENTION

A planetary gear mechanism applied to an automatic transmission and a center differential includes a plurality of pinion gears geared with a sun gear and ring gears and a carrier for supporting the plural pinion gears. An external peripheral surface of the pinion gear is formed with teeth engaged with a tooth flank of the sun gear and the ring hears. An internal peripheral surface of the pinion gear inserted with is a pinion pin to be relatively rotatable via rolling bearing.

A known planetary gear mechanism is disclosed in Japanese Utility Model Registered No. 2508622. The known planetary gear disclosed in Japanese Utility Model Registered No. 2508622 is shown in FIGS. 5–6.

As shown in FIGS. 5–6, a planetary gear mechanism 120 includes a sun gear 121, a ring gear 123, four planetary gears geared with the sun gear 121 and the ring gear 123, a carrier 125 for supporting the planetary gears 122 so that the planetary gears 122 rotate about the sun gear 121, four pinion pins 126, one end portion of each pinion pin 126 is inserted into a shaft bore portion formed on the carrier for rotatably supporting the respective planetary gears 122, and a plate shaped stopper 134 unitary provided on the carrier 125 for fixing the pinion pins 126.

A recess groove is formed on an end portion of each pinion pin 126. The stopper 134 is provided with four fitting portions 134c fitting in the respective recess grooves by adjusting a phase of the stopper 134 for restricting the axial and rotational movement of the pinion pin 126. Four bent portions 134b are formed on an external periphery of the stopper 134. The movement of the stopper 134 relative to the carrier 125 in the axial direction is restricted by covering convex portions 125i formed on the external periphery of the carrier 125 wrapping with the bent portions 134b. Further, the rotational movement of the stopper 134 relative to the carrier 125 is restricted by fitting convex portions 125j and the convex portions 125i and the bent portion 134b alternately between adjacent projecting portions 124e of input case 124 of the planetary gear mechanism 120.

Notwithstanding, because the bent portions 134b of the stopper 134 are required to be wrap the external periphery of the convex portions 125i of the carrier 125 in order to restrict the axial and rotational movement of the stopper 134 relative to the carrier 125, the bent portions 134b are required to be bent to be conformed to the convex portions 125i. Thus, complicated operation is required at assembling. Although the bent portions 134b may be formed in advance for assembling the stopper 134 by rotating after fitting the pinion pins 126 in the planetary gears 122, the stopper 134 cannot be assembled to the carrier 124 when the rotational directional position of the stopper 134 relative to the carrier 125 is deviated because the carrier 125 defines the position of the stopper 134 in the rotational direction. Thus, this method is not favorable for assembling.

A need thus exists for a planetary gear mechanism which includes favorable assembling performance.

SUMMARY OF THE INVENTION

In light of the foregoing, the present invention provides a planetary gear which includes a sun gear, a ring gear provided coaxial to the sun gear, a plurality of pinion gears geared with the sun gear and the ring gear, a plurality of pinion pins provided at internal peripheral side and coaxial to the pinion gear to be rotatable relative to the pinion gear, a carrier having penetration bores inserted with axial end portions of the pinion pin for unitary supporting the plural pinion pins so that the plural pinion gears rotate about the sun gear, a plate member provided on the carrier under a condition that a movement of the plate member relative to the carrier is restricted, a slit formed on an axial end portion of the pinion pin projected from one of the penetration bores along a surface of the plate member, a fitting portion unitary formed on the plate member to be fitted into the slit, a recess portion of the carrier recessed in an axial direction, and a projecting portion unitary formed on the plate member to be engaged with the recess portion of the carrier.

According to another aspect of the present invention, a method for assembling a planetary gear mechanism includes a plurality of pinion gears geared with the sun gear and the ring gear, a plurality of pinion pins provided at internal peripheral side and coaxial to the pinion gear to be rotatable relative to the pinion gear, a carrier having penetration bores inserted with axial end portions of the pinion pin for unitary supporting the plural pinion pins, a plate member provided on the carrier under a condition that a movement of the plate member relative to the carrier is restricted, a recess portion unitary formed on the plate member, a slit formed on an axial end portion of the pinion pin projected from one of the penetration bores along a surface of the plate member, a fitting portion unitary formed on the plate member to be fitted into the slit, a recess portion of the carrier recessed in an axial direction, a projecting portion unitary formed on the plate member to be engaged with the recess portion of the carrier, a wall portion provided on the carrier for covering an external periphery of the plate member, a groove formed on an internal surface of the wall portion, and a C-ring being fitted into the groove under compression. The method for assembling the planetary gear mechanism includes steps of positioning the pinion gear in the carrier coaxial to the penetration bore, inserting the pinion pin into the penetration bore and an internal of the pinion gear so that an end portion of the pinion pin is positioned approximately in the middle length of the pinion gear in the axial direction, applying the plate member to the pinion pin so that the pinion pin has an identical phase to the recess portion of the plate member, fitting the fitting portion into the slit by rotating the plate member relative to the carrier, stopping the rotation of the plate member for positioning the projecting portion of the plate member at an identical phase to the recess portion, displacing the plate member and the pinion pin in an axial direction while maintaining the projecting portion and the recess portion at the same phase for contacting the plate member to the carrier, and fitting the C-ring into the groove formed on the wall portion of the carrier.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
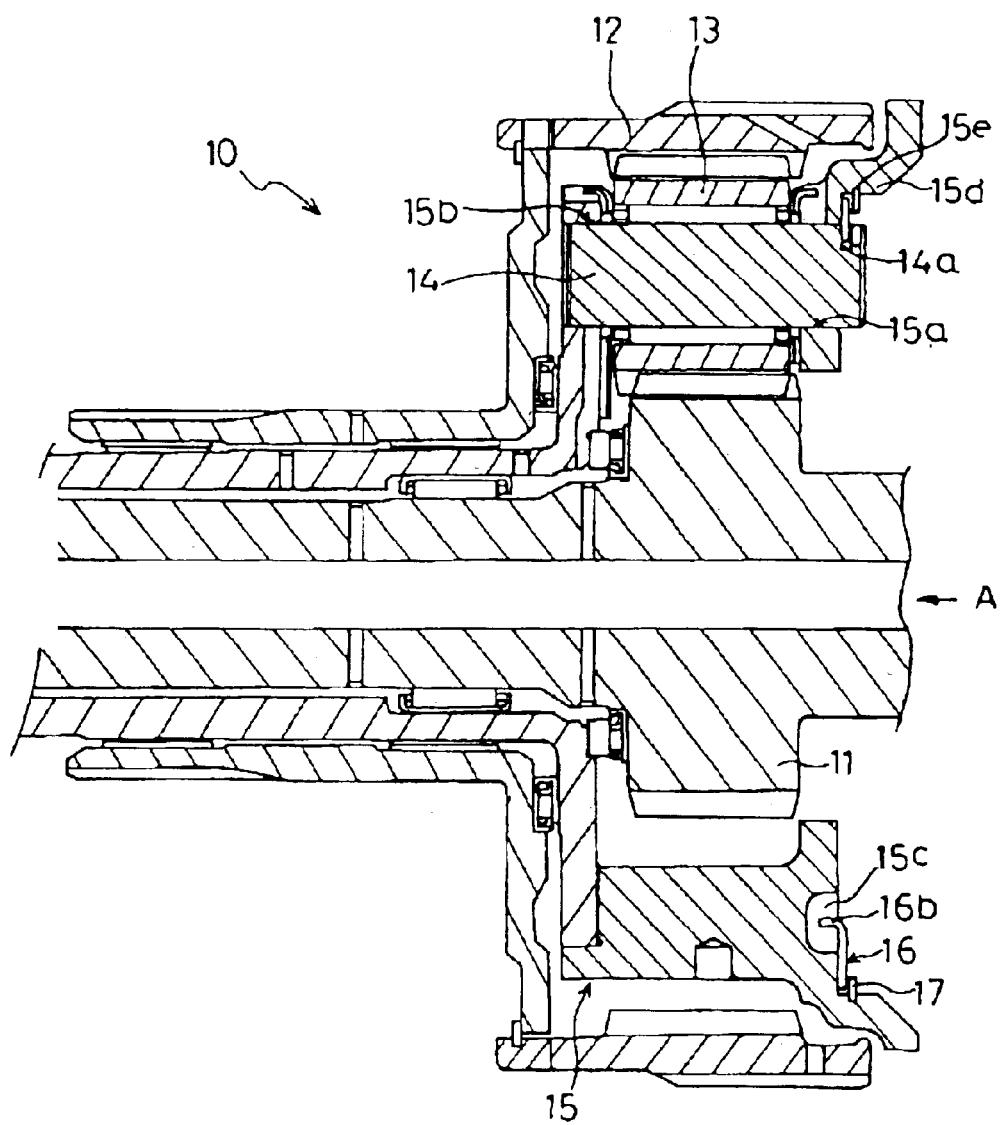
FIG. 1 is a longitudinal cross-sectional view of a planetary gear mechanism according to a first embodiment of the present invention.

Embodiments of a planetary gear mechanism according to the present invention will be explained with reference to the illustrations of the drawing figures. With the embodiments, the planetary gear mechanism is applied to an automatic transmission.

Figure 2:
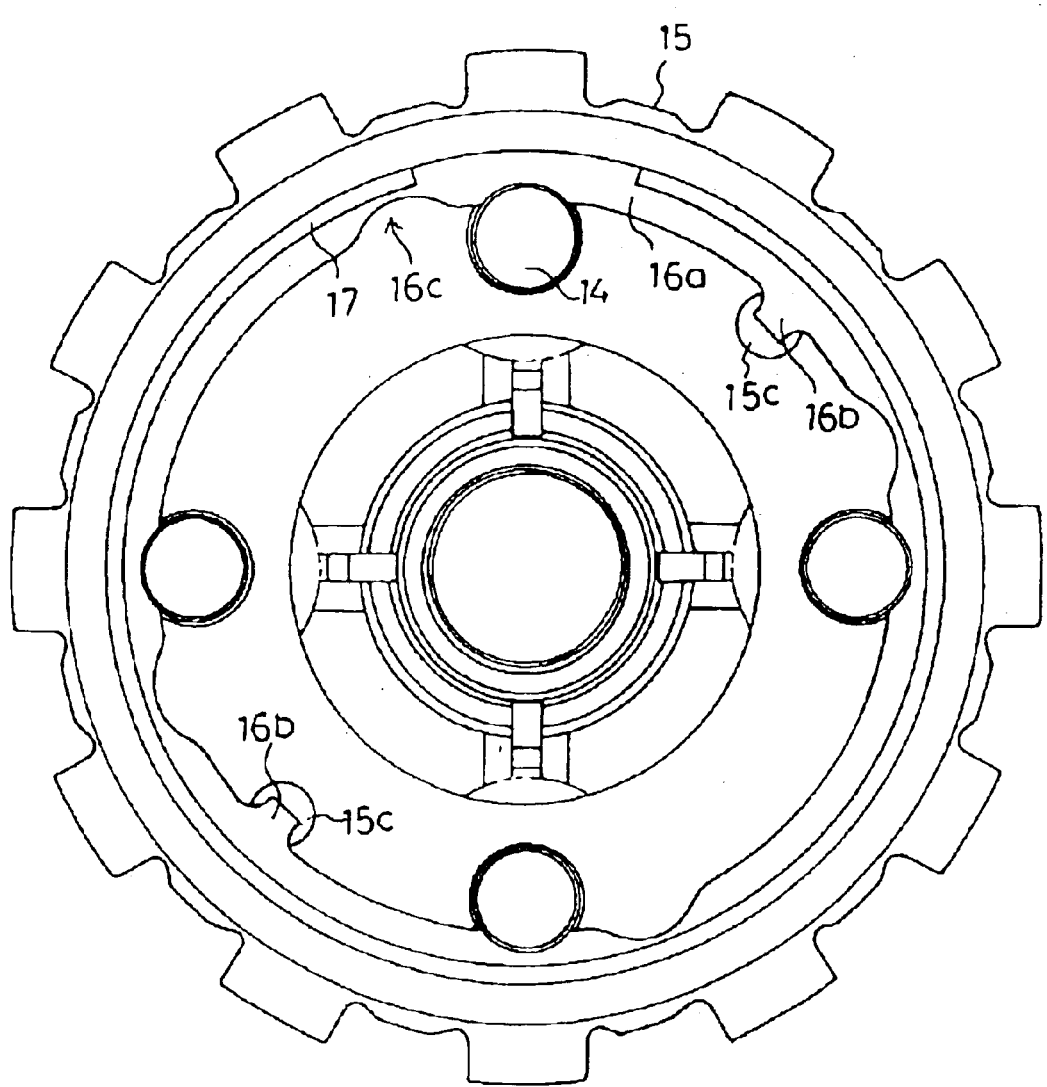
FIG. 2 is a cross-sectional view viewed from A of FIG. 1 before assembling a sun gear.

Referring to FIGS. 1–2, a first embodiment of a planetary gear mechanism 10 will be explained. The planetary gear mechanism 10 includes a sun gear 11, a ring gear 12 provided co-axial to the sun gear 11, four pinion gears 13, pinion pins 14 provided on an internal peripheral side of respective pinion gears 13, a carrier 15 unitary supporting pinion pins 14 so that four pinion gears 13 rotate about the sun gear 11, and a plate member 16 provided, on the carrier 15.

The sun gear 11, the ring gear 12, and the carrier 15 are connected to an input shaft of the automatic transmission, a case of the automatic transmission, an output shaft of the automatic transmission, or other elements of the planetary gear mechanism (not shown) via different frictional engagement elements. Input-output relations relative to the sun gear 11, the ring gear 12, and the carrier 15 are switched by switching the engagement and the disengagement of the frictional engagement elements when shifting the automatic transmission.

A tooth flank is formed on an external peripheral surface of the pinion gear 13 to be geared with the sun gear 11 and the ring gear 12. The pinion pin 14 is provided at the internal peripheral side of each pinion gear 13 via a bearing to be relatively rotatable and coaxial to the pinion gear 13. Penetration bores 15a, 15b inserted with end portions of the pinion pin 14 are formed on the carrier 15. Four penetration bores 15a are formed on a first face and four penetration bores 15b are formed on a second face of the carrier 15.

The fixing construction between the pinion pins 14 and the carrier 15 will be explained as follows. A slit 14a is formed on a first axial end portion of the pinion pin 14 projected from the penetration bore 15a on the first side of the carrier 15. The slit 14a is formed to be perpendicular to the axial direction of the pinion pin 14 along a surface of the plate member 16. Two recess portions 15c recessed in axial direction are formed on portions of the carrier 15 facing the plate member 16 where the pinion pins 14 are not assembled. The carrier 15 includes a cylindrical wall portion 15d on the side facing the plate member 16. A groove 15e is formed on an internal peripheral surface of the wall portion 15d in a peripheral direction. The plate member 16 is configured to have a ring shape in which fitting portions 16a fitted into the slits 14a and the projecting portions 16b projecting to be fitted into the corresponding recess portion 15c. The plate member 16 is assembled to the carrier 15 under a condition that the external periphery of the plate member 16 is covered with the internal peripheral surface of the wall portion 15d. A C-ring 17 is provided on the plate member 16 to be fitted into the groove 15e for fixing the plate member 16. The projecting portion 16b is formed when manufacturing the plate member 16 by stamping the plate member 16 in the axial direction.

The configuration of the plate member 16 will be further explained as follows. The fitting portions 16a correspond to the internal periphery of the plate member 16 and are designed to be positioned at a smaller diameter position of the carrier 15 compared to the position of a portion of the circumference of the penetration bores 15a, 15b for overlapping a most external peripheral portion of the penetration bores 15a, 15b. Four recess portions 16c recessed in an outwardly radial direction relative to the fitting portions 16a are formed on the plate member 16. An interval between the recess portions 16c is determined to be the same with an interval of the penetration bores 15a, 15b in the peripheral direction. The projecting portions 16b are formed at two positions of the internal peripheral side of the plate member 16 to be further radially internal compared to the fitting portions 16a. A phase of the projecting portion 16b is determined to be the same with the phase of the recess portion 15c of the carrier 15. The projecting portions 16b and the inputting portions 16a are arranged so that the recess portions 16c do not overlap the penetration bores 15a under the state that the projecting portions 16b and the recess portions 15c are engaged by fitting the projecting portions 16b of the plate member 16 into the recess portions 15c of the carrier 15.

Accordingly, the axial movement of the pinion pins 14 relative to the carrier 15 is restricted by fitting the fitting portions 16a into the respective slits 14a and by restricting the external peripheral portion of the plate member 16 relative to the carrier 15 with the C-ring 17. Further, the rotational directional movement of the plate member 16 relative to the carrier 15 is restricted by the engagement between the projecting portions 16b and the recess portion 15. Thus, the movement of the pinion pins 14 is restricted in the rotational direction relative to the carrier 15.

The fixing method between the pinion pins 14 and the carrier 15 according to the planetary gear mechanism 10 will be explained as follows. The pinion gear 13 is provided inside of the carrier 15 so that the pinion gear 13 becomes coaxial to the penetration bores 15a, 16a. The pinion gear 13 inserted with a bearing along with washers is positioned to a desired position of inside of the carrier 15 either from an internal peripheral side or from an external peripheral side. Thereafter, the pinion pins 14 are inserted into the corresponding penetration bores 15a and the internal peripheral surface of the pinion gear 13 so that one end of each pinion pin 14 which is to be inserted into the penetration bore 15b reaches approximately middle position of the pinion gear 13 in the axial direction Then, the plate member 16 is applied to the pinion pins 14 by conforming the phase of the pinion pins 14 and the recess portions 16c. By positioning the plate member 16 corresponding to the slits 14a of the pinion pins 14, the plate member 16 is rotated in the peripheral direction relative to the carrier 15 so that each fitting portion 16a is fitted into the corresponding slit 14a. The rotation of the plate member 16 is stopped at a position where the projecting portions 16b and the recess portions 15c have the same phase. At this point, the projecting portions 16b are not engaged with the recess portions 15c. Thereafter, the plate member 16 and the pinion pins 14 are further displaced in the axial direction under the condition that the projecting portions 16b and the recess portions 15c are at the same phase to contact the plate member 16 to the carrier 15. Finally, by fitting the C-ring 17 into the groove 15e formed on the internal wall portion 15d of the carrier 15, the pinion pins 14 and the carrier 15 are fixed.

With the planetary gear mechanism according to the first embodiment of the present invention, the rotational movement of the pinion pins 14 relative to the carrier 15 is restricted with a simple construction by engaging the recess portions 15c and the projection portions 16b regarding the rotational direction. Thus, the pinion pins 14 can be fixed relative to the carrier 15 using the plate member 16 with simple construction. Further, because the projecting portions 16b are formed on the radially internal peripheral side of the plate member 16, the plate member 16 per se does not increases the size in the radial direction. In addition, the projecting portions 16b of the plate member 16 can be easily formed with stamping.

A second embodiment of a planetary gear mechanism according to the present invention will be explained as follows. With the planetary gear mechanism according to the second embodiment, a portion of the plate member is open to form a C-ring configuration so that the plate member per se includes a function which is the same with the C-ring of the first embodiment of the present invention. Other constructions of the planetary gear mechanism according to the second embodiment of the present invention is the same with the construction of the first embodiment. Thus, the explanation is not repeated.

Figure 3:
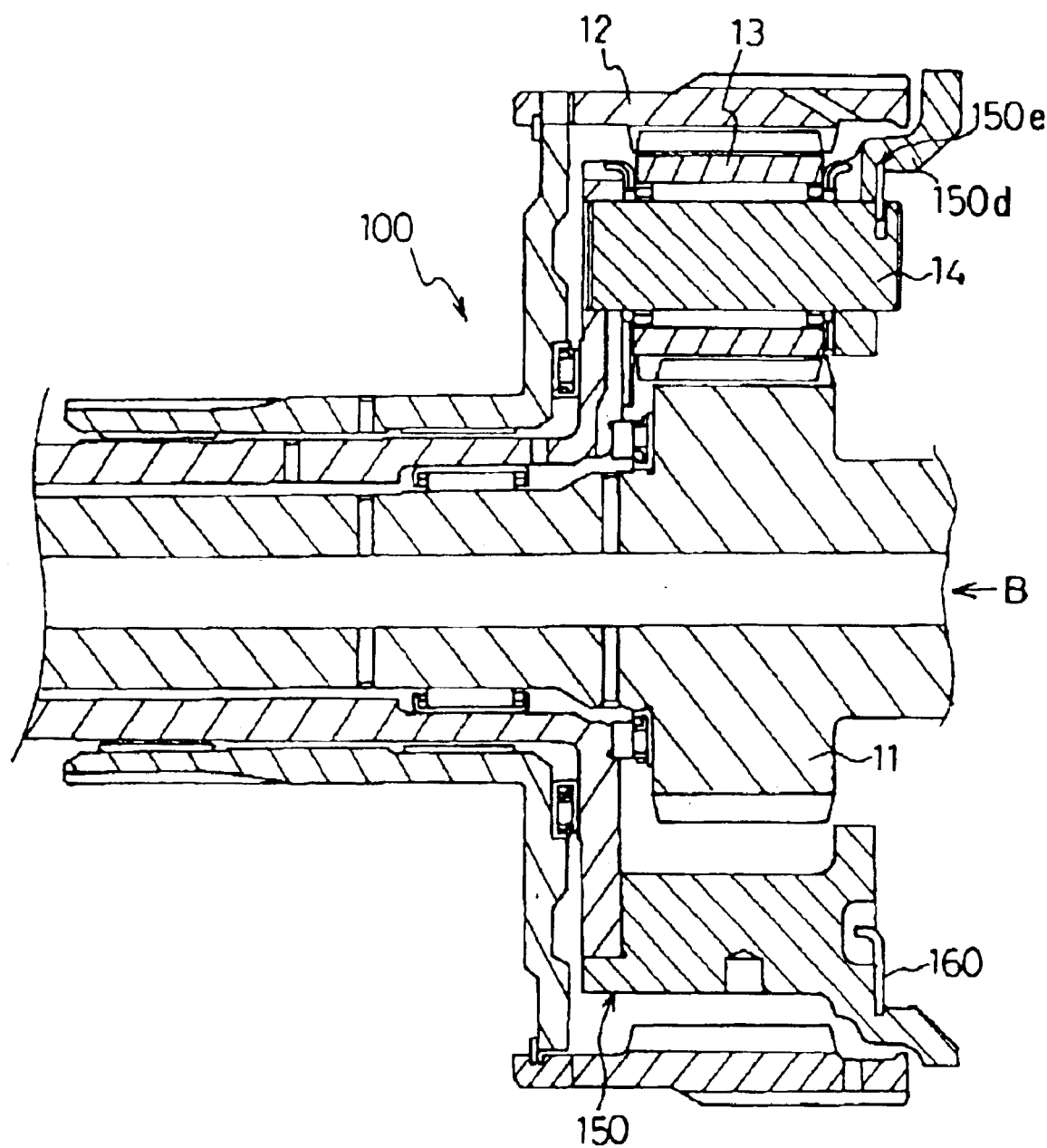
FIG. 3 is a longitudinal cross-sectional view showing a planetary gear mechanism according to a second embodiment of the present invention.
Figure 4:
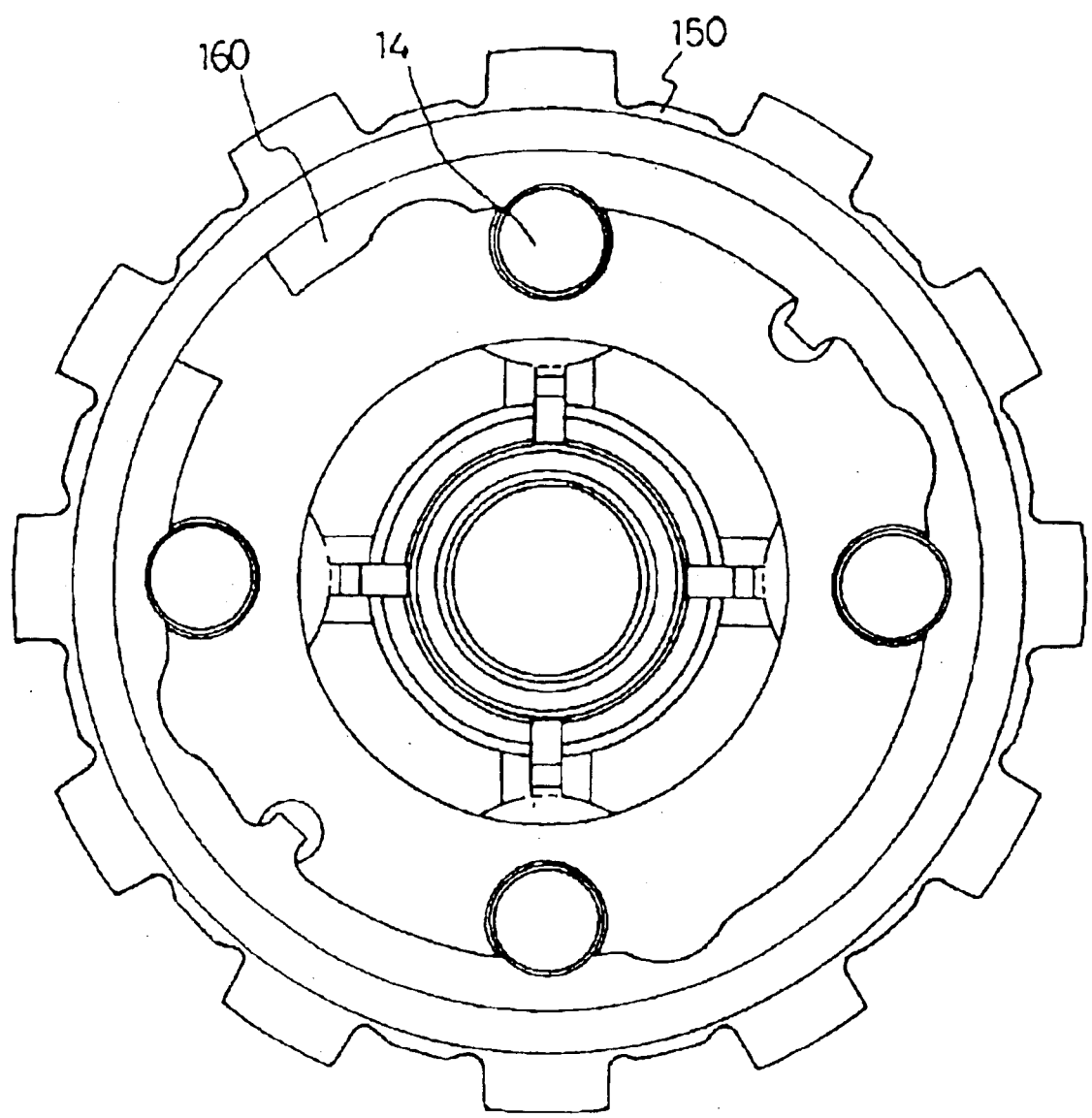
FIG. 4 is a cross-sectional view viewed from B of FIG. 3 before assembling a sun gear.
Figure 5:
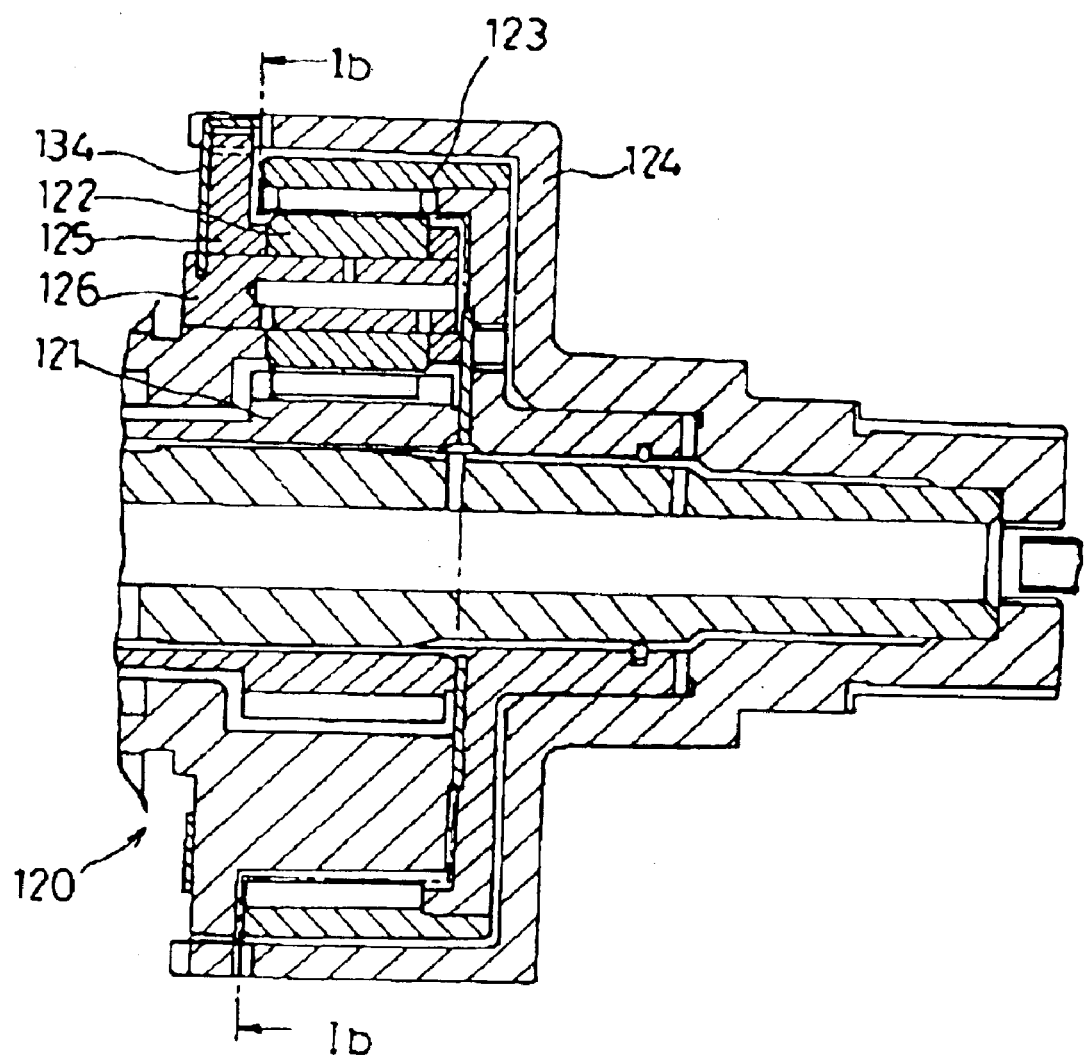
FIG. 5 is a cross-sectional view showing a known planetary gear mechanism.
Figure 6:
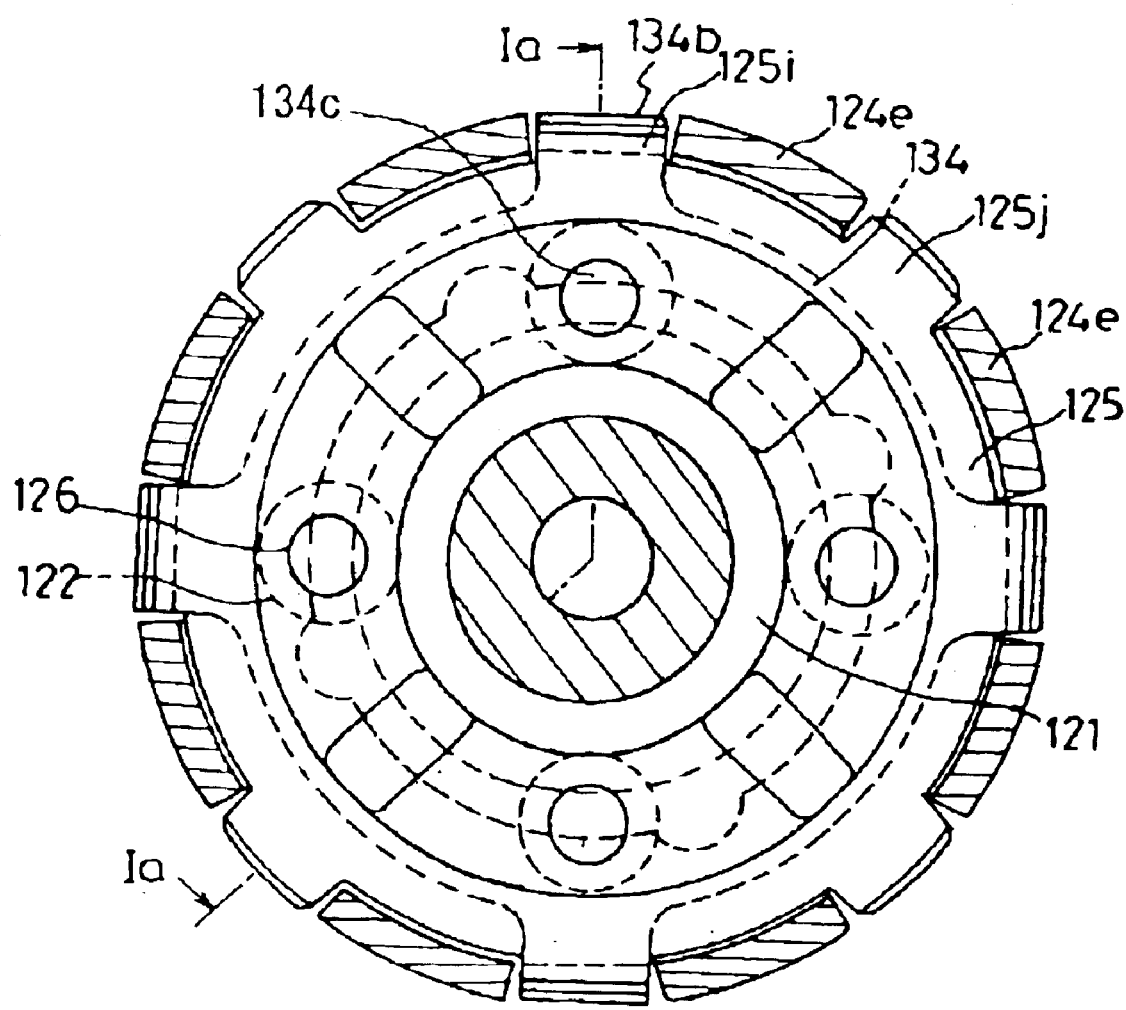
FIG. 6 is a view of the known planetary gear mechanism taken on line Ib—Ib of FIG. 5.

As shown in FIGS. 3–4, the same numerals are applied to the identical constructions with the planetary gear mechanism of the first embodiment (e.g., the sun gear 11, the ring gear 12, the pinion gear 13, and the pinion pin 14). The movement of a plate member 160 in the axial direction relative to a carrier 150 is restricted by fitting an external peripheral portion of the plate member 160 into a groove 150e formed on an internal surface of a wall portion 150d of the carrier 150.

With the construction of the planetary gear mechanism according to the second embodiment of the present invention, the number of parts and time for assembling is reduced because it is not required to provide the C ring as a separated member in addition to achieving the effects of the first embodiment.

The planetary gear mechanism of the present invention is not limited to the foregoing embodiments. Although the planetary gear mechanism of the foregoing embodiments is applied to the automatic transmission, the planetary gear mechanism of the present invention may be applied to a center differential for four wheel drive vehicles.

According to the embodiments of the present invention, the rotation of the pinion pins relative to the carrier is restricted with a simple construction by engaging the recess portion of the carrier and the projecting portion of the plate member. Thus, the pinion pins can be fixed to the carrier with the plate member of simple construction.

According to the embodiments of the present invention, the carrier includes the wall portion covering the external periphery of the plate member and the C-ring is fitted into the groove formed on the internal peripheral surface of the wall portion. Thus, the axial movement of the plate member relative to the carrier can be restricted.

According to the embodiment of the present invention, the increase of the number of the parts can be restrained by providing the function of the C-ring in the plate member.

According to the embodiment of the present invention, the projecting portions of the plate member are formed on the internal peripheral side of the plate member. Thus, the size increase of the plate member per se in the radial direction can be restrained.

According to the embodiment of the present invention, the projecting portions are formed by bending the portions of the plate member in the axial direction. Thus, the construction of the plate member per se can be simplified.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A planetary gear comprising:
    a sun gear;
    a ring gear provided coaxial to the sun gear;
    a plurality of pinion gears geared with the sun gear and the ring gear;
    a plurality of pinion pins provided at internal peripheral side and coaxial to the pinion gear to be rotatable relative to the pinion gear;
    a carrier having penetration bores inserted with axial end portions of the pinion pin for unitarily supporting the plural pinion pins so that the plural pinion gears rotate about the sun gear;
    a plate member provided on the carrier under a condition that a movement of the plate member relative to the carrier is restricted;
    a slit formed on an axial end portion of the pinion pin projected from one of the penetration bores along a surface of the plate member;
    a fitting portion unitary formed on the plate member to be fitted into the slit;
    a recess portion of the carrier recessed in an axial direction; and
    a projecting portion unitarily formed on the plate member to be engaged with the recess portion of the carrier.

2. A planetary gear mechanism according to claim 1, wherein the carrier comprises
    a wall portion provided for covering an external periphery of the plate member and a groove formed on an internal surface of the wall portion; wherein the planetary gear mechanism further comprises a C-ring being fitted into the groove under compression.

3. A planetary gear mechanism according to claim 2, wherein the plate member is the C-ring under the compression.

4. A planetary gear mechanism according to claim 1, wherein the projection portion of the plate member is formed on an internal periphery of the plate member.

5. A planetary gear mechanism according to claim 2, wherein the projecting portion of the plate member is formed on an internal periphery of the plate member.

6. A planetary gear mechanism according to claim 3, wherein the projecting portion of the plate member is formed on an internal periphery of the plate member.

7. A planetary gear mechanism according to claim 1, wherein the projecting portion of the plate member is formed by bending an end of the plate member in an axial direction.

8. A planetary gear mechanism according to claim 2, wherein the projecting portion of the plate member is formed by bending an end of the plate member in an axial direction.

9. A planetary gear mechanism according to claim 3, wherein the projecting portion of the plate member is formed by bending an end of the plate member in an axial direction.

10. A planetary gear mechanism according to claim 4, wherein the projecting portion of the plate member is formed by bending an end of the plate member in an axial direction.

11. A method for assembling a planetary gear mechanism comprising:

a plurality of pinion gears geared with the sun gear and the ring gear;

a plurality of pinion pins provided at internal peripheral side and coaxial to the pinion gear to be rotatable relative to the pinion gear;

a carrier having penetration bores inserted with axial end portions of the pinion pin for unitarily supporting the plural pinion pins;

a plate member provided on the carrier under a condition that a movement of the plate member relative to the carrier is restricted;

a recess portion unitarily formed on the plate member;

a slit formed on an axial end portion of the pinion pin projected from one of the penetration bores along a surface of the plate member;

a fitting portion unitary formed on the plate member to be fitted into the slit;

a recess portion of the carrier recessed in an axial direction;

a projecting portion unitarily formed on the plate member to be engaged with the recess portion of the carrier;

a wall portion provided on the carrier for covering an external periphery of the plate member;

a groove formed on an internal surface of the wall portion; and a C-ring being fitted into the groove under compression; wherein the method for assembling the planetary gear mechanism comprises steps of:

positioning the pinion gear in the carrier coaxial to the penetration bore;

inserting the pinion pin into the penetration bore and an internal of the pinion gear so that an end portion of the pinion pin is positioned approximately in the middle length of the pinion gear in the axial direction;

applying the plate member to the pinion pin so that the pinion pin has an identical phase to the recess portion of the plate member;

fitting the filling portion into the slit by rotating the plate member relative to the carrier;

stopping the rotation of the plate member for positioning the projecting portion of the plate member at an identical phase to the recess portion;

displacing the plate member and the pinion pin in an axial direction while maintaining the projecting portion and the recess portion at the same phase for contacting the plate member to the carrier; and fitting the C-ring into the groove formed on the wall portion of the carrier.

12. A planetary gear comprising:

a sun gear;

a ring gear provided coaxial to the sun gear;

a plurality of pinion gears geared with the sun gear and the ring gear;

a plurality of pinion pins provided at an internal peripheral side and coaxial to the pinion gear to be rotatable relative to the pinion gear;

a carrier having penetration bores receiving axial end portions of the pinion pin for unitarily supporting the plural pinion pins so that the plural pinion gears rotate about the sun gear;

a plate member provided on the carrier;

a slit formed on the axial end portion of the pinion pin projecting from one of the penetration bores along a surface of the plate member;

a fitting portion unitarily formed on the plate member and fitted into the slit;

a recess portion of the carrier recessed in an axial direction; and a projecting portion unitarily formed on the plate member and positioned in the recess portion of the carrier to restrict movement of the plate member relative to the carrier.

13. A planetary gear mechanism according to claim 12, wherein the carrier comprises a wall portion covering an external periphery of the plate member and a groove formed on an internal surface of the wall portion; wherein the planetary gear mechanism further comprises a C-ring fitted into the groove under compression.

14. A planetary gear mechanism according to claim 13, wherein the plate member is the C-ring under the compression.

15. A planetary gear mechanism according to claim 12, wherein the projection portion of the plate member is formed on an internal periphery of the plate member.

16. A planetary gear mechanism according to claim 13, wherein the projecting portion of the plate member is formed on an internal periphery of the plate member.

17. A planetary gear mechanism according to claim 12, wherein the projecting portion of the plate member is formed by bending an end of the plate member in an axial direction.

18. A planetary gear mechanism according to claim 13, wherein the projecting portion of the plate member is formed by bending an end of the plate member in an axial direction.

19. A planetary gear mechanism according to claim 14, wherein the projecting portion of the plate member is formed by bending an end of the plate member in an axial direction.

* * * * *